United States Patent
Knapp

(10) Patent No.: US 9,127,683 B2
(45) Date of Patent: Sep. 8, 2015

(54) HIGH TEMPERATURE RADIAL BEARING FOR ELECTRICAL SUBMERSIBLE PUMP ASSEMBLY

(71) Applicant: Baker Hughes Incorporated, Houston, TX (US)

(72) Inventor: John M. Knapp, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 427 days.

(21) Appl. No.: 13/667,645

(22) Filed: Nov. 2, 2012

(65) Prior Publication Data

US 2014/0127052 A1 May 8, 2014

(51) Int. Cl.
| | |
|---|---|
| *F16C 27/02* | (2006.01) |
| *F04D 13/10* | (2006.01) |
| *H02K 5/132* | (2006.01) |
| *F04D 29/047* | (2006.01) |
| *H02K 5/167* | (2006.01) |
| *H02K 7/08* | (2006.01) |

(52) U.S. Cl.
CPC ............ *F04D 13/10* (2013.01); *F04D 29/0473* (2013.01); *F16C 27/02* (2013.01); *H02K 5/1677* (2013.01); *H02K 7/088* (2013.01); *F16C 2360/44* (2013.01); *H02K 5/132* (2013.01)

(58) Field of Classification Search
CPC ...... H02K 7/088; H02K 5/1677; F04D 13/10; F04D 29/0473
See application file for complete search history.

(56) References Cited

U.S. PATENT DOCUMENTS

| | | | |
|---|---|---|---|
| 5,559,383 A | 9/1996 | Ide | |
| 5,659,214 A | 8/1997 | Guardiani et al. | |
| 6,007,313 A * | 12/1999 | Sigel et al. | 417/424.1 |
| 6,424,066 B1 * | 7/2002 | Watson et al. | 310/90 |
| 6,566,774 B2 | 5/2003 | Parmeter et al. | |
| 7,182,584 B2 | 2/2007 | Du et al. | |
| 7,780,424 B2 | 8/2010 | Parmeter et al. | |
| 8,079,829 B2 | 12/2011 | Geisinger et al. | |
| 2005/0109515 A1 * | 5/2005 | Watson et al. | 166/369 |
| 2009/0039722 A1 * | 2/2009 | Cain et al. | 310/90 |
| 2010/0166578 A1 | 7/2010 | Watson | |

* cited by examiner

*Primary Examiner* — Charles Freay
*Assistant Examiner* — Lilya Pekarskaya
(74) *Attorney, Agent, or Firm* — Bracewell & Giuliani LLP

(57) ABSTRACT

A submersible pump assembly includes a rotary pump and an electrical motor operatively connected to the pump for driving the pump. A seal section is connected between the motor and the pump for reducing a pressure differential between lubricant in the motor and hydrostatic well fluid pressure. A shaft assembly extends from the motor through the seal section and the pump. A sleeve surrounds the shaft assembly. A carrier body has an inner diameter surface. An anti-rotation member is on an exterior of the carrier body in static engagement with an inner diameter surface of the pump assembly for preventing rotation of the carrier body. An annular metal radially deflectable spring is located between and in contact with an outer diameter surface of the sleeve and with the inner diameter surface of the carrier body. The spring is a wave spring with undulations.

19 Claims, 2 Drawing Sheets

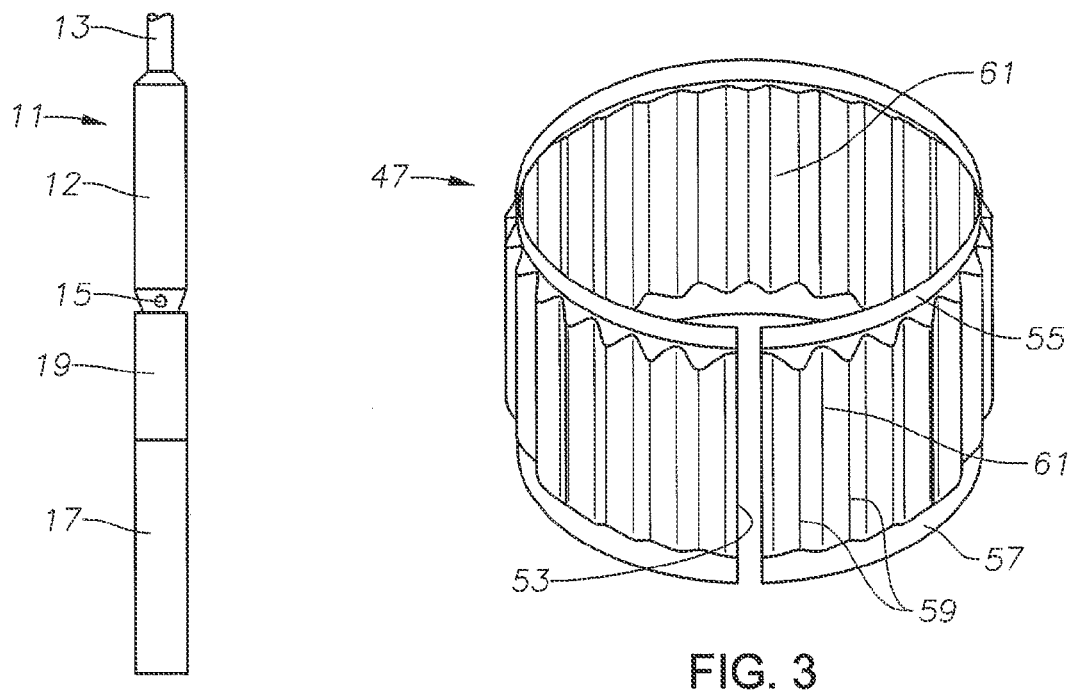
FIG. 1
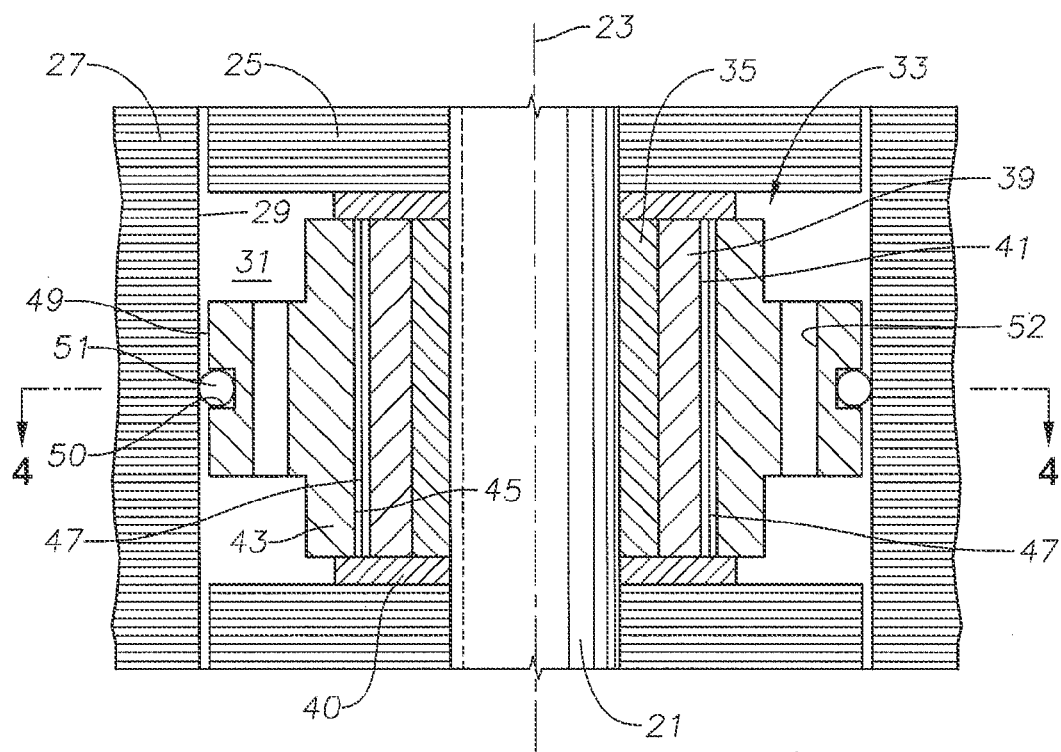
FIG. 3
FIG. 2

HIGH TEMPERATURE RADIAL BEARING FOR ELECTRICAL SUBMERSIBLE PUMP ASSEMBLY

FIELD OF THE DISCLOSURE

This invention relates in general to electrical submersible well pump assemblies and in particular to all metal, high temperature radial bearings within the motor.

BACKGROUND

An electrical pump assembly (ESP) of the type used in hydrocarbon producing wells includes a rotary pump coupled to an electrical motor by a seal section. The assembly may also include a gas separator. The pump may be a centrifugal pump with a large number of stages, each stage having an impeller and diffuser. Alternately, the pump may be a progressing cavity pump. The motor has a stator with a central longitudinal cavity containing a rotor mounted to a drive shaft. Because of the length of the motor, radial bearings are located between sections of the rotor to radially stabilize the shaft.

Various types of radial bearings are employed. One type of radial bearing has an inner sleeve mounted to the shaft for rotation with the shaft. A carrier body surrounds the inner sleeve and may be in sliding contact with the inner sleeve. Alternately, an outer sleeve my be located between the carrier body and the inner sleeve. An anti-rotation member on the outer diameter of the carrier body frictionally or positively engages an inner diameter surface of the stator to prevent the carrier body from rotating. Elastomers may be located between the carrier body and the outer sleeve to prevent rotation of the outer sleeve and dampen vibration of the shaft.

The carrier body and the sleeve are typically formed of different materials with different coefficients of expansion (CTE). Thermal expansion causes the annular space between the carrier body and the outer sleeve to change, either increasing or decreasing. The elastomers between the carrier body and the outer sleeve will compensate for the thermal growth and prevent the outer sleeve from rotating. However, some wells are too hot for elastomers, particularly steam assisted gravity type (SAGD) wells in Canada. The temperatures may be as high as 575 degrees F.

SUMMARY

A submersible pump assembly includes a rotary pump and an electrical motor operatively connected to the pump for driving the pump. A shaft assembly extends from the motor through a seal section and the pump. One or more sleeves surround the shaft assembly. A carrier body has an inner diameter surface and an anti-rotation member on an exterior of the carrier body in static engagement with the inner diameter surface of the motor for preventing rotation of the carrier body. An annular metal radially deflectable spring is located between and in contact with an outer diameter surface of an outer one of the sleeves and with the inner diameter surface of the carrier body. The spring applies radial forces to prevent the outer sleeve from rotating or moving axially within the carrier body. The metal spring is able to maintain sufficient radial force between the carrier body and the sleeve even at high temperatures.

The spring has a wall having a plurality of indentations for undulations formed therein. The indentations may include outward-extending indentations formed in and extending around the wall, each of the outward-extending indentations protruding radially outward from the wall into static, frictional engagement with the inner diameter surface of the carrier body. The indentations may also include a plurality of inward-extending indentations formed in and extending around the wall into static, frictional engagement with the outer diameter surface of the sleeve. The inward-extending indentations alternate with the outward-extending indentations.

Preferably, each of the outward-extending indentations and each of the inward-extending indentations has a length greater than a width. In the preferred embodiment, the outward-extending indentations and the inward-extending indentations define a sinusoidal configuration while viewed in a transverse cross-section.

The spring may be a wave spring having a circumscribed outer diameter that prior to insertion between the carrier body and the sleeve is initially greater than the inner diameter surface of the carrier body. The wave spring has a circumscribed inner diameter that prior to insertion between the carrier body and the sleeve is initially smaller than the outer diameter surface of the sleeve. Circumferentially extending bands may exist at opposite ends of the cylindrical wall. The indentations extend between the bands.

The spring is in static, frictional engagement with the inner diameter surface of the pump assembly and the outer diameter surface of the sleeve. The radial bearing may be in the motor and mounted between two of the rotor sections.

BRIEF DESCRIPTION OF THE DRAWINGS

FIG. 1 is a schematic view of an electrical submersible well pump assembly having radial bearings in the motor in accordance with this disclosure.

FIG. 2 is a sectional view of one of the radial bearings for the motor of the well pump assembly of FIG. 1.

FIG. 3 is a perspective view of a spring contained in the bearing of FIG. 2 and shown removed from the bearing.

DETAILED DESCRIPTION OF THE DISCLOSURE

Figure 4:
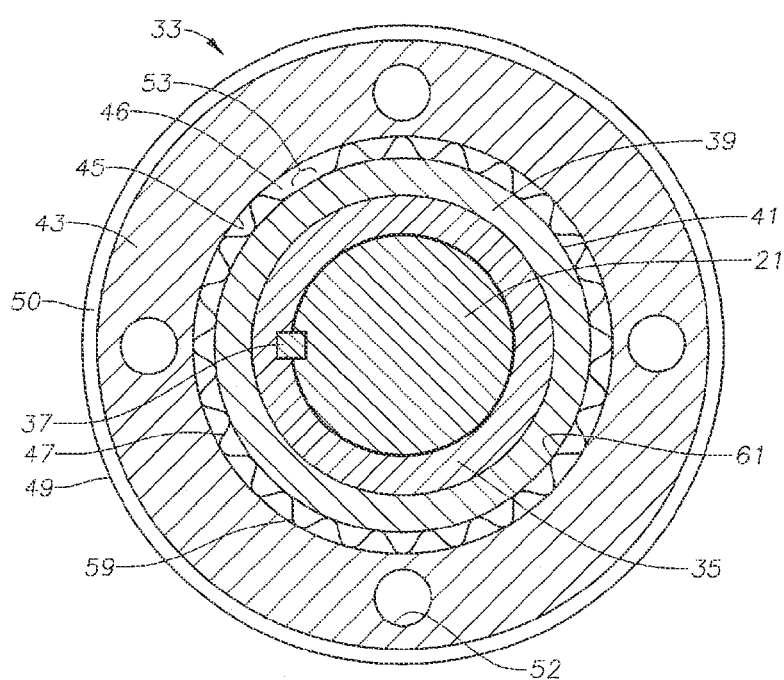
FIG. 4 is a sectional view of the bearing of FIG. 2, taken along the line 4-4 of FIG. 2 and shown removed from the stator.

Referring to FIG. 1, an electrical well pump assembly (ESP) 11 of a type typically used for oil well pumping operations is illustrated. ESP 11 includes a rotary pump 12 that may be a centrifugal pump having a large number of stages, each of the stages having an impeller and a diffuser. Pump 12 could also be a progressing cavity pump, which has a helical rotor that rotates within an elastomeric double helical stator. Pump 12 is normally suspended in a well on a string of production tubing 13. Pump 12 has an intake 15 and discharges into production tubing 13. ESP 11 also includes an electrical motor 17 for driving pump 12. Motor 17 connects to pump 12 via a seal section 19, which has means for reducing a pressure differential between lubricant within motor 17 and the hydrostatic pressure in the well. ESP 11 may also include a gas separator.

Referring to FIG. 2, motor 17 has a shaft 21 extending along a longitudinal axis 23. A number of rotor sections 25 are mounted to shaft 21 for imparting rotation to shaft 21. Motor 17 has a stationary stator 27 with an inner diameter 29 that defines a central cavity 31. Shaft 21 and rotor sections 25 are mounted within central cavity 31. Supplying voltage to windings within stator 27 causes rotor sections 25 to rotate, which in turn drives pump 12 (FIG. 1). Motor 17 may have a length of 30 feet or more, thus radially stabilizing shaft 21 to reduce vibration is important.

A radial bearing 33 is mounted between each of the rotor sections 25 to radially stabilize shaft 21. Bearing 33 preferably has an inner bushing or sleeve 35 that is affixed to shaft 21 to avoid wear on shaft 21. Inner sleeve 35 is secured by a key 37 (FIG. 4) to shaft 21, which transmits rotation but allows some axial movement of inner sleeve 35 relative to shaft 21. Inner sleeve 35 may be formed of a hard, wear resistant material such as tungsten carbide.

A non-rotating outer sleeve 39 closely surrounds inner sleeve 35. A small clearance, which may have a radial width as small as a 0.001 inch, is located between outer sleeve 39 and inner sleeve 35. Bearing 33 is immersed in motor lubricant, which lubricates the engaging surfaces of inner sleeve 35 and outer sleeve 39. Outer sleeve 39 is formed of a hard, wear resistant material such as tungsten carbide and has a cylindrical outer diameter 41. Thrust washers 40 may also be located between each rotor section 25 and an end of inner sleeve 35 to prevent contact of the rotor sections 25 with the carrier body 43. Outer sleeve 39 may have the same or a slightly less axial length than inner sleeve 35. Thrust washers 40 encounter axial forces if rotor sections 25 move axially relative to radial bearing 35. The axial movement may occur due to thermal growth at high temperature operating conditions.

A carrier body 43 surrounds outer sleeve 39 and has an inner diameter 45 spaced radially outward from outer sleeve outer diameter 41, creating an annular gap 46. A wave spring 47 is located in annular gap in frictional engagement with both the outer sleeve outer diameter 41 and carrier body inner diameter 45. Carrier body 43 has an outer diameter 49 closely spaced from but not touching stator inner diameter 29. Carrier body 43 may have one or more circumferential grooves 50 on its outer diameter 49. An anti-rotation member 51 is located in circumferential groove 50 and protrudes therefrom into frictional engagement with stator inner diameter 29. Anti-rotation member 51 is resilient and biased between carrier body 43 and stator 27 to prevent carrier body 43 from rotating relative to stator 27. In this embodiment, anti-rotation member 51 comprises a metal coil spring so as to withstand high temperatures during operation in a well. A positive lock, such as a key, might also be used. Carrier body 43 has several flow by passages 52 extending through it parallel with longitudinal axis 23. Carrier body 43 is formed of a metal that is non-magnetic, such as a titanium alloy.

Referring to FIG. 3, wave spring 47 is formed of a metal, such as a spring steel. One example of a suitable metal is Hastelloy. Wave spring 47 is a curved strip that is formed into a partially cylindrical shape with an end gap 53 between its ends. In the example shown, wave spring 47 has a circumferentially extending upper band 55 formed on its upper end and a circumferentially extending lower band 57 formed on its lower end. The terms "upper" and "lower" are used for convenience only as ESP 11 may be used in a horizontal portion of a well. Upper and lower bands 55, 57 extend only a short distance from each end of wave spring 47 and optionally may be eliminated. Wave spring 47 may have a length or axial dimension equal to or less than a length of outer sleeve 39 and carrier body 43.

A plurality of outward-extending indentations 59 are permanently formed in wave spring 47, creating convex shapes extending around wave spring 47. Outward-extending indentations 59 extend from upper band 55 to lower band 57 and are parallel with axis 23 (FIG. 2). Each indentation 59 is elongated, having a length greater than its width. An inward-extending indentation 61 is located between each outward extending indentation 59, creating concave shapes on the exterior of wave spring 47. Inward-extending indentations 61 are identical to outward-extending indentations in length and width. Each inward-extending indentation 61 protrudes radially inward from upper and lower bands 55, 57 a same radial distance as each outward-extending indentation 59. When viewed in cross-section, as in FIG. 4, inward and outward extending indentations 59, 61 define a sinusoidal configuration.

Figure 5:
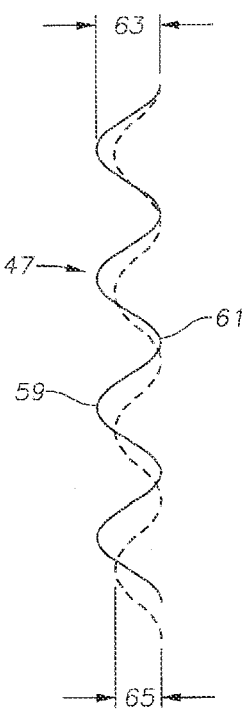
FIG. 5 is a schematic view of a portion of the spring of FIG. 3, shown in an original and a deflected state.

Referring to FIG. 5, prior to insertion between outer sleeve 39 and carrier body 43, wave spring 47 has an initial inner diameter circumscribed by inward-extending indentations 61 that is less than outer sleeve outer diameter 41. Wave spring 47 has an initial outer diameter circumscribed by outward-extending indentations 59 that is greater than carrier body inner diameter 45. Wave spring 47 has an initial radial width 63 that is greater than the radial distance 65 between outer sleeve 39 and carrier body 43. When inserted into gap 46 between outer sleeve 39 and carrier body 43, wave spring 47 will elastically deflect, as indicated by the dotted lines in FIG. 5, to create radial inward and outward directed bias forces.

Wave spring 47 locks outer sleeve 39 to carrier body 43 to prevent outer sleeve 39 from rotating. Wave spring 47 also accommodates thermal growth, which changes the radial width of the annular space 46 between outer sleeve 39 and carrier body 43. Wave spring 47 also permits oil flow through bearing 33 to enhance cooling. Being of different materials, the coefficients of thermal expansion (CTE) between outer sleeve 39 and carrier body 43 differ. For example, the CTE of inner sleeve 35 and outer sleeve 39, each of which is tungsten carbide, may be about 2.7 micro inches per inch per degree F. The CTE of titanium alloy carrier body 43 may be about 5.0 to 5.5. ESP 11 may encounter conditions such as minus 40 degrees F. during transport or storage in northern climates to 575 degrees F. while operating in a SAGD (steam assistance gravity) well in Canada. The radial width of the annular space 46 between outer sleeve outer diameter 41 and carrier body inner diameter 45 is determined based on the differences in CTE. The radial width of annular space 46 and the shape of wave spring 47 are exaggerated in the drawing, and for a motor 17 of about 4.5 inches in diameter, the radial width of annular space 46 may be about 0.040 to 0.050 inch. Annular space 46 increases in radial width due to an increase in temperature. Wave spring 47 must have sufficient strength to exert a force on inner sleeve 35 that prevents inner sleeve 35 from rotating at high temperature operating conditions at all expected temperatures of motor 17. In one application, calculations show that wave spring 47 exerts a radial force between carrier body 43 and outer sleeve 39 that is about 300 pounds at minus 40 degrees F. and 50 pounds at 600 degrees F. To accommodate this requirement, wave spring 47 has an initial radial width 63 that elastically deflects about 10 to 15 percent to installed radial width 65 when forced into annular space 46. During insertion, wave spring 47 inner diameter increases and its outer diameter decreases. The end gap 53 between ends of wave spring 47 decreases from its initial dimension to its installed dimension.

In operation, wave spring 47 is forced with a press into annular space 46, locking outer sleeve 39 to carrier body 43. Wave spring 47 forms static frictional engagements with outer sleeve 39 and carrier body 43. Motor 17 and portions of seal section 19 are filled with a dielectric lubricant and assembled with pump 12 to form ESP 11. An operator runs ESP 11 into a well to pump well fluid. Supplying power to the windings in stator 27 causes rotor sections 25 to rotate shaft 21. Coil spring 51 frictionally engages stator inner diameter 29, preventing carrier body 43 from rotating. Wave spring 47 prevents outer sleeve 39 from rotating with inner sleeve 35. As the operating temperature increases, the radial width of annular space 46 changes, typically increasing. The resilience of wave spring 47 continues to exert radial forces between outer sleeve 39 and carrier body 43, preventing outer sleeve 39 from rotating. Also, wave spring 47 dampens vibration of shaft 21.

While this disclosure has been shown in only one of its forms, it should be apparent to those skilled in the art that it is not so limited but is susceptible to various modifications without departing from the scope. For example, shapes of indentations 59, 61 may differ. Wave spring 47 could have only outward-extending indentations 59 or only inward-extending indentations 61. Inner sleeve 35 could be an integral part of shaft 21, rather than a separate member. A similar wave spring may be used in radial bearings of pump 12 and seal section 19.

The invention claimed is:

1. A submersible pump assembly, comprising:
a rotary pump having a longitudinal axis;
an electrical motor operatively connected to the pump for driving the pump;
a seal section connected between the motor and the pump for reducing a pressure differential between lubricant in the motor and hydrostatic well fluid pressure;
a shaft assembly extending from the motor through the seal section and the pump;
a sleeve surrounding the shaft assembly;
a carrier body having an inner diameter surface;
an anti-rotation member on an exterior of the carrier body in static engagement with the inner diameter surface of the pump assembly for preventing rotation of the carrier body; and
an annular metal radially deflectable spring located between and in contact with an outer diameter surface of the sleeve and with the inner diameter surface of the carrier body for preventing the sleeve from rotating; wherein:
the spring comprises a wave spring having a circumscribed outer diameter that prior to insertion between the carrier body and the sleeve is initially greater than the inner diameter surface of the carrier body; and
the wave spring has a circumscribed inner diameter that prior to insertion between the carrier body and the sleeve is initially smaller than the outer diameter surface of the sleeve.

2. The pump assembly according to claim 1, wherein the spring comprises a wall having a plurality of indentations formed therein.

3. The pump assembly according to claim 1, wherein the spring comprises:
a cylindrical wall; and
a plurality of outward-extending indentations formed in and spaced around the wall, each of the outward-extending indentations protruding radially outward from the wall into static, frictional engagement with the inner diameter surface of the carrier body.

4. The pump assembly according to claim 1, wherein the spring comprises:
a cylindrical wall having spaced apart ends that define an end gap to enable the spring to be contracted and expanded;
a plurality of outward-extending indentations formed in and extending around the wall in static, frictional engagement with the inner diameter surface of the carrier body; and
a plurality of inward-extending indentations formed in and extending around the wall in static, frictional engagement with the outer diameter surface of the sleeve, the inward-extending indentations alternating with the outward-extending indentations.

5. The pump assembly according to claim 4, wherein each of the outward-extending indentations and each of the inward-extending indentations has a length greater than a width.

6. The pump assembly according to claim 4, wherein the outward-extending indentations and the inward-extending indentations define a sinusoidal configuration while viewed in a transverse cross-section.

7. The pump assembly according to claim 1, wherein the spring comprises:
a cylindrical wall having spaced apart ends that define a gap to enable the spring to be contracted and expanded;
circumferentially extending bands at opposite ends of the cylindrical wall;
a plurality of indentations formed in and extending around the cylindrical wall, each of the indentations extending axially between the bands and having a length greater than a width, the indentations protruding radially outward and radially inward in an alternating manner.

8. The pump assembly according to claim 1, wherein the spring is in static, frictional engagement with the inner diameter surface of the carrier body and the outer diameter surface of the sleeve.

9. The pump assembly according to claim 1, wherein:
the motor comprises a stator having a central opening that defines the inner diameter surface of the pump assembly;
a plurality of rotor sections are mounted to the shaft assembly and located within the central opening of the stator;
the radial bearing is mounted between two of the rotor sections.

10. A submersible pump assembly, comprising:
a rotary pump;
an electrical motor operatively coupled to the pump for driving the pump; the motor comprising:
a stator having an inner diameter surface defining a central opening with a longitudinal axis;
a shaft extending axially through the central opening;
a plurality of rotor sections mounted to the shaft and located within the central opening;
an inner sleeve mounted to the shaft between the rotor sections for rotation therewith;
a metal outer sleeve surrounding the inner sleeve in sliding engagement;
a metal carrier body having an inner diameter surface defining a bore in which the hub outer sleeve is located;
an anti-rotation member on an exterior of the carrier body in static engagement with the inner diameter surface of the stator for preventing rotation of the carrier body; and
an annular metal wave spring located in an annular space between the carrier body and the outer sleeve and in static frictional contact with an outer diameter surface of the outer sleeve and in static frictional contact with the inner diameter surface of the carrier body, thereby preventing rotation of the outer sleeve relative to the carrier body.

11. The pump assembly according to claim 10, wherein the annular metal wave spring comprises:

a cylindrical wall;
a plurality of outward-extending indentations that alternate with inward-extending indentations formed in and spaced around the wall, each of the outward-extending indentations and the inward-extending indentations having a length greater than a width; wherein
the outward-extending indentations engage the inner diameter surface of the carrier body; and
the inward-extending indentations engage the outer diameter surface of the outer sleeve.

12. The pump assembly according to claim 11, wherein the outward-extending indentations and the inward-extending indentations define a sinusoidal configuration while viewed in a transverse cross-section.

13. The pump assembly according to claim 10, wherein:
the annular metal wave spring has a circumscribed outer diameter that prior to insertion between the carrier body and the outer sleeve is initially greater than the inner diameter surface of the carrier body; and
the annular metal wave spring has a circumscribed inner diameter that prior to insertion between the carrier body and the outer sleeve is initially smaller than the outer diameter surface of the outer sleeve.

14. The assembly according to claim 10, wherein the annular metal wave spring comprises:
a cylindrical wall formed into a cylindrical configuration with an end gap between ends of the cylindrical wall;
circumferentially extending bands at opposite ends of the cylindrical wall; and
a plurality of indentations formed in and extending around the cylindrical wall, each of the indentations extending axially between the bands and having a length greater than a width, the indentations protruding radially outward and radially inward in an alternating manner.

15. The pump assembly according to claim 14, wherein the indentations comprise outward-extending indentations with rounded convex configurations and inward-extending indentations with rounded concave shapes.

16. The pump assembly according to claim 10, wherein:
the inner sleeve and the outer sleeve are formed of tungsten carbide, and the carrier body is formed of a metal having a different coefficient of thermal expansion than the tungsten carbide of the inner sleeve and the outer sleeve, causing a radial width of the annular space to increase and decrease in response to temperature changes of the bearing; and
the spring increases and decreases in radial width measured from a circumscribed inner diameter to a circumscribed outer diameter in response to increases and decreases in the radial width of the annular space.

17. A submersible pump assembly, comprising:
a rotary pump;
an electrical motor operatively connected to the pump for driving the pump, the motor comprising:
a stator having an inner diameter surface defining a central opening with a longitudinal axis;
a shaft extending axially through the central opening;
a plurality of rotor sections mounted to the shaft and located within the central opening;
a radial bearing mounted between two of the rotor sections, comprising:
an inner sleeve formed of a carbide material and mounted to the shaft for rotation therewith;
an outer sleeve formed of a carbide material surrounding and in sliding engagement with the inner sleeve;
a carrier body having an inner diameter surface defining a bore in which the outer sleeve is located, the carrier body being formed of a metal having a different coefficient of thermal expansion than the outer sleeve and the inner sleeve, the inner diameter surface of the carrier body being larger than an outer diameter surface of the outer sleeve, defining an annular space;
an anti-rotation member on an exterior of the carrier body in static engagement with the inner diameter surface of the stator for preventing rotation of the carrier body;
an annular wave spring located in the annular space in static contact with an outer diameter surface of the outer sleeve and in static contact with the inner diameter surface of the carrier body, the wave spring comprising:
a cylindrical wall having an end gap to allow elastic contraction and expansion of the wave spring while being inserted into the annular space;
a plurality of alternating inward and outward extending indentations formed in and spaced around the cylindrical wall, each of the indentations extending axially and having a length greater than a width, the inward and outward extending indentations defining a sinusoidal configuration when viewed in a transverse cross-section; wherein
the wave spring is configured to exert radial forces on the carrier body and the outer sleeve to prevent rotation of the outer sleeve while the motor is operating at a temperature of 575 degrees F;
the different coefficient of expansion of the carrier body from the outer sleeve causing the annular space to change in radial width as the temperature of the bearing changes; and
a radial dimension of the wave spring increases and decreases in response to changes in the radial width of the annular space due to temperature changes.

18. The pump assembly according to claim 17, wherein the wave spring has an initial radial dimension prior to insertion into the annular space that is measured between a circumscribed inner diameter and a circumscribed outer diameter, the initial radial dimension being greater than an initial radial width of the annular space.

19. The pump assembly according to claim 17, wherein the wave spring has prior to insertion in the annular space an initial circumscribed inner diameter smaller than the outer diameter surface of the outer sleeve and an initial circumscribed outer diameter larger than the inner diameter surface of the carrier body.

* * * * *